(12) United States Patent
Morozumi et al.

(10) Patent No.: US 7,376,245 B2
(45) Date of Patent: May 20, 2008

(54) AUTOMATIC TRACKING METHOD FOR GOLF SWING

(75) Inventors: Tatsuru Morozumi, 2140-2, Obuchi, Fujino-cho, Tsukui-gun, Kanagawa (JP); Masahiko Ueda, Hyogo (JP); Masahide Onuki, Hyogo (JP)

(73) Assignees: SRI Sports Limited, Kobe (JP); Tatsuru Morozumi, Kanagawa (JP)

( * ) Notice: Subject to any disclaimer, the term of this patent is extended or adjusted under 35 U.S.C. 154(b) by 746 days.

(21) Appl. No.: 10/824,409

(22) Filed: Apr. 15, 2004

(65) Prior Publication Data

US 2004/0208342 A1    Oct. 21, 2004

(30) Foreign Application Priority Data

Apr. 16, 2003  (JP)  ............................. 2003-111966
Jul. 18, 2003   (JP)  ............................. 2003-276385

(51) Int. Cl.
*G06K 9/46* (2006.01)

(52) U.S. Cl. ..................... 382/103; 382/107; 434/258

(58) Field of Classification Search ................ None
See application file for complete search history.

(56) References Cited

U.S. PATENT DOCUMENTS 5,111,410 A    5/1992  Nakayama et al.
5,772,522 A *  6/1998  Nesbit et al. ............... 473/222
2004/0005088 A1* 1/2004 Jeung et al. ................. 382/128

FOREIGN PATENT DOCUMENTS

| JP | 9-154996 A | 6/1997 |
| JP | 2974018 B2 | 6/1998 |
| JP | 2001-614 A | 1/2001 |
| WO | WO 03/005281 A1 | 1/2003 |

* cited by examiner

*Primary Examiner*—Brian P. Werner
*Assistant Examiner*—Elisa M Rice
(74) *Attorney, Agent, or Firm*—Birch, Stewart, Kolasch & Birch, LLP

(57) ABSTRACT

Provided is an automatic tracking method for a golf swing, the following steps of: attaching colored marks onto a golfer and a golf club; adopting a specific still image as a reference image to store reference color information and coordinate data of each of the marks; setting, on a search range, which is a region including the position of the mark predicted on the next image and setting a color range of each mark that is an allowable range, in which colors can be regarded as the same as reference color information regarding a pixel, as a position of a mark, in a case where the absolute value of a difference between the still image being considered on which a differential processing has been conducted with the background image in the search range and the reference color information falls within the color range and is the minimum.

17 Claims, 7 Drawing Sheets
(1 of 7 Drawing Sheet(s) Filed in Color)

AUTOMATIC TRACKING METHOD FOR GOLF SWING

This Nonprovisional application claims priority under 35 U.S.C. § 119(a) on Patent Application No(s). 2003-111966 filed in Japan on Apr. 16, 2003, and 2003-276385 filed in Japan on Jul. 18, 2003, the entire contents of which are hereby incorporated by reference.

BACKGROUND OF THE INVENTION

1. Field of the Invention

The present invention relates to an automatic tracking method for a golf swing, and in particular, to a method for automatically tracking a colored mark attached to a shaft of a golf club or/and a body of a golfer on a camera photographed image.

2. Description of the Background Art

A motion-diagnosing apparatus as shown in FIG. 7 has been conventionally disclosed in Japanese Patent No. 2794018 as an apparatus for analyzing a golf swing.

The motion-diagnosing apparatus includes: a TV camera 2 photographing a swing motion of a person 1 to be diagnosed; a processing apparatus 3 connected to the TV camera 2 and a CRT 4 displaying a result of the diagnosis, wherein provided on the person 1 to be diagnosed are movement points $P_1$ to $P_6$ at which reflecting tapes are adhered.

The processing apparatus 3 includes: means for converting image data transmitted from the TV camera 2 to digital signals; means for extracting coordinates of movement points $P_1$ to $P_6$ from the image data; means for conducting an arithmetic operation on the coordinates of the movement points $P_1$ to $P_6$ into numerical data showing characteristics of the motion; means evaluating the obtained numerical data by comparing it with numerical data of comparative reference; and means for diagnosing the swing based on evaluation values.

The movement points $P_1$ to $P_6$ on the image data are individually provided with respective window frames enclosing them so that each of the movement points $P_1$ to $P_6$ is recognized in a corresponding window frame and individually tracked.

In swing analyzing apparatuses disclosed in Japanese Patent Application Laid-Open Nos. 2001-614 and 9-154996, sensors capable of measuring an axial direction are attached to a wrist or the like to obtain a wrist joint angle or the like and to thereby detect a motion of a player and analyze a swing thereof.

According to a motion-diagnosing apparatus disclosed in Japanese Patent No. 2794018, however, a risk arise that a background image other than the movement points $P_1$ to $P_6$ is erroneously recognized as the movement points $P_1$ to $P_6$ in a case where in the background image other than the movement points $P_1$ to $P_6$, there are present sites close to the movement points $P_1$ to $P_6$ in luminance and color. Furthermore, a problem arises that if a person 1 to be diagnosed actually conducts a swing motion, the movement points $P_3$, $P_4$ and $P_6$ attached to a shoulder, a hip and the like are hidden by movement of an arm to thereby cause tracking error in regard to the movement points $P_1$ to $P_6$, thereby reducing a measurement precision.

Moreover, not only does a problem arise that in a case where the different movement points $P_1$ to $P_6$ are superimposed one on another when viewed from the TV camera 2, as well, a failure occurs in tracking of the movement points $P_1$ to $P_6$, but a risk also occurs that in a case where the movement points $P_1$ to $P_6$ become close to one another in position when viewed from the TV camera 2, though not being superimposed, plural ones of the movement points $P_1$ to $P_6$ are detected in a window frame, leading to an erroneous recognition of the movement points $P_1$ to $P_6$.

In Japanese Patent Application Laid-Open Nos. 2001-614 and 9-154996, not only is it hard to measure many of points because of use of a sensor, but a possibility also arises that a swing different form an essential swing of a person to be diagnosed is sensed under an influence of a sensor being attached to the body of the person to be diagnosed even if a movement of one site is measured.

SUMMARY OF THE INVENTION

The present invention has been made in light of the above problems and it is an object of the present invention not only to reduce tracking error in a case where a point of a measurement objective is hidden by an arm or the like or in a case where different points are superimposed one on the other or one on another, or close to each other or one another, but also to prevent erroneous recognition of a background image as the point.

The present invention, in order to achieve the object, provides an automatic tracking method for a golf swing, including the following steps of: attaching colored marks to plural positions including any one site of a golfer, which is a measurement objective, and at least one necessary position on a golf club that the golfer uses before the golfer initiates a swing; photographing a background image of a swing place in which a golfer is not photographed and a swing moving image from a scene at address of the golfer to the finish thereof with a camera as color images; not only storing the photographed background image into a computer, but also storing plural still images converted from the swing moving image into the computer; adopting, of the still images, a specific still image in which all the marks can be recognized as a reference image and storing reference color information and coordinate data (positional information) of each mark manually or automatically in advance; setting, on a still image being considered, for each of the mark positions thereon, a search range, which is a region including the position of the predicted mark on a still image adjacent in chronological order to the still image being considered and a wait range which is a region larger than the search range, in consideration of a case where the marks would not be recognized in the search range; setting a color range of each mark that is an allowable range, in which colors can be regarded as the same as reference color information thereof; changing the search range of the still image being considered to the wait range thereof in a case where a mark is hidden and not recognized in the search range thereof; regarding a pixel, as a position of a mark, in a case where the absolute value of a difference between a color of the pixel in the still image being considered on which a differential processing has been conducted with the background image in the search range or the wait range and the reference color information falls within the color range and is the minimum of absolute values obtained from other pixels to conduct a color search and obtain coordinate data; and automatically tracking the marks moving during the swing.

According to the method, since it is determined, in order to detect a position of each of the marks, whether or not the absolute value of a difference from the reference color information falls within the color range not in the entire display screen but only in a search range which is a region including a position to which the mark being considered is predicted to be moved at the next time point and a wait range thereof, a color close to the mark being considered in the still image, if it was included therein, would be excluded, thereby enabling erroneous recognition to be prevented.

By excluding a background image in regard to each pixel in the search range and the wait range of a still image by conducting a differential processing with the background image, a color close to a mark being considered in the background image in the search range and the wait range, if it was included therein, would be excluded, thereby enabling erroneous recognition to be prevented.

Since the color range is set to thereby allow more latitude in recognition of being the same color, a color of a photographed mark, even in a case where it makes a subtle change under an influence of lighting in a swing place, is recognized to be the color of one of the marks with certainty, thereby enabling error in color information obtained to be tolerated.

While a mark is usually tracked automatically in a search range, the search range, in which the mark is not in sight due to an arm or the like moved in the swing, is changed to the wait range larger than the search range; therefore, it is prevented that the mark emerges outside the range when the mark is started coming in sight in the course of advancement of the swing image in chronological order, thereby enabling retracking of the mark with certainty.

While at least two mark attaching sites are required on the golf club, a mark or marks are required at least one site and more preferably at least two sites on a golfer and further more preferably at two more sites on a left elbow and a left wrist.

Note that while a reference image is preferably a still image in which a golfer is at an address posture, another still image advanced in chronological order in which all the marks can be recognized is selected as a reference image so that reference color information and coordinate information can be obtained of all the marks if all the marks cannot be found in the address image and, as in this case, the first still image cannot be a reference image, the tracking processing not only go forward in chronological order but also go backward in reverse chronological order.

The colored marks are preferably provided at least two sites spaced from each other on the shaft of a golf club in the length direction thereof; and at at least one site or preferably two or more site on a golfer selected from the group consisting of the head, the right and left shoulders, the right and left elbows, the right and left wrists, the right and left hips, the right and left knees, the right and left ankles and the right and left toes.

In a case where the lower half of the body is diagnosed, the colored marks are more preferably provided at both knees, both ankles and the fore-ends of both feet.

That is, marks are provided at joint portions of a golfer, thereby enabling an analysis of a swing of a golfer to be performed with higher precision. In a case where a pixel which has the absolute value of a difference from the reference color information being in the color range and being the minimum of absolute values in the search range or the wait range is regarded as a position of a mark and coordinate data thereof is obtained, it is selectable whether or not a differential processing with the background image is conducted on each of the mark positions.

With such a procedure adopted, for example, a differential processing with a background image is conducted only in a search range (or a wait range) having a possibility that a background image having a color in the close proximity of the color of a mark appears therein, while on the other hand, no differential processing is conducted in a search range having a low value in possibility that a background image in the close proximity of the color of a mark appears therein, thereby enabling a calculation speed to be enhanced without reducing a recognizability of a mark.

It is preferable to differently set colors of marks, of the plural marks, having chances to be close to each other or one another, or superimposed one on the other or one on another during a swing.

That is, by adopting marks, in different colors, having a possibility of being in the close proximity of each other or one another in position during a swing, it can be prevented to identify the marks erroneously even if the marks are in one search range.

One of the marks is adopted as a reference mark and tracked to measure a moving distance of the reference mark among still images at respective different time points, and in a case where another mark is tracked, a color search is conducted in a search range on an new still image corresponding to the another mark and the search range is moved by the moving distance of the reference mark.

It is especially preferable to adopt, as a reference mark, a mark provided to the right wrist or the left wrist of a golfer, or a mark closer to a wrist of at least two marks provided on a shaft, in which case the another mark is preferably provided on a shaft.

Since the grip hands of the golfer and a golf shaft move in an almost similar way, a search range corresponding to the another mark provided on the shaft is moved on a new still image by the moving distance of a reference mark provided at the right wrist or left wrist or a reference mark closer to a wrist of the at least two marks provided on the shaft, thereby enabling a possibility to recognize the another mark provided on the shaft in the new search range to be increased in color search. Furthermore, it is possible to set a search range narrowly by increasing recognizability, thereby again enabling a calculation time to be shortened.

With increase in recognizability in a search range, a tendency arises that a wait range with a larger area is used only in still images of a few frames immediately before the impact during which movements of marks attached at the right wrist or the left wrist of a golfer or on a shaft is at the maximum speed, thereby enabling a frequency of use of wait ranges and a useless search time to be both reduced.

In a case where a mark being considered cannot be recognized in a search range on a still image, the search range is changed to the wait range thereof on the same still image and a color search is conducted in a region in the wait range other than the search range where the color search has been conducted already.

In a case where one search range is set for each mark on the still image of the same frame, a search range has to be set sufficiently large giving consideration to a downswing fast in movement if it is desired to recognize, with certainty, a mark provided at a wrist of a golfer and a mark provided on a shaft in both of a backswing slow in movement and a downswing fast in movement. In the present invention, however, since a construction is adopted in which if, as shown in the above description, as a result of color search in a search range, which is a smaller region, a mark being considered cannot be recognized, color search is conducted in a wait range, which is a larger region, on the still image of the same frame: thus the search is conducted over the two stages and a search range used for usual color search is set small, thereby enabling a useless calculation time to be reduced. That is, in a case of a backswing slow in movement and the like, a mark is recognized in a small search range, while in a case of a downswing fast in movement, a search range is changed to a wait range, which is a larger region if the mark cannot be recognized in color search in the search range, to conduct a color search there for recognition of the mark.

As is clear in the previous description, according to the present invention, since a judgement region for detecting a position of each of the marks is not over all of the display screen, but only a region including a position of each mark and a position predicted at the next time point after the mark moves, erroneous recognition can be prevented because of exclusion of a color close to the mark even if it is included in a still image. A differential processing is conducted on a pixel, with a background image, in a search range on the still image to exclude the background image, thereby enabling erroneous recognition by excluding a color in the background image of the search range close to the color of the mark if the color is present in the background image. Furthermore, since there is provided a latitude in recognition of being the same color as a mark in color information by setting the color range, the color of a photographed mark, even in a case where the color subtly changes under an influence of lighting or the like in a swing place, can be recognized with certainty to be the color of a mark.

The patent or application file contains at least one drawing executed in color. Copies of this patent or patent application publication with color drawing(s) will be provided by the Office upon request and payment of the necessary fee.

In a case where a mark is hidden by an arm and the like and cannot be in sight, a search range is changed to a wait range, which is a region larger than the search range, to thereby prevent emergence of the mark outside the range when the mark is started coming into sight after a moving image is advanced in chronological order, thereby enabling retracking of the mark to be conducted with certainty.

It is made possible to select whether or not a differential processing with the background image is conducted in a search range or a wait range; thereby, for example, a differential processing with the background image is conducted only in a case where there is present a possibility that a background image close in color to a mark emerges in a search range or a wait range, thereby enabling a calculation speed to be raised without reducing recognizability of the mark.

Different colors are selected for marks in the close proximity of each other or one another or having a possibility to be superimposed one on the other or one on another, therefore, enabling erroneous recognition of the marks therebetween even in a case where the marks are present in one search range.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

Description will be given of an embodiment of the present invention with reference to the accompanying drawings.

Figure 1:
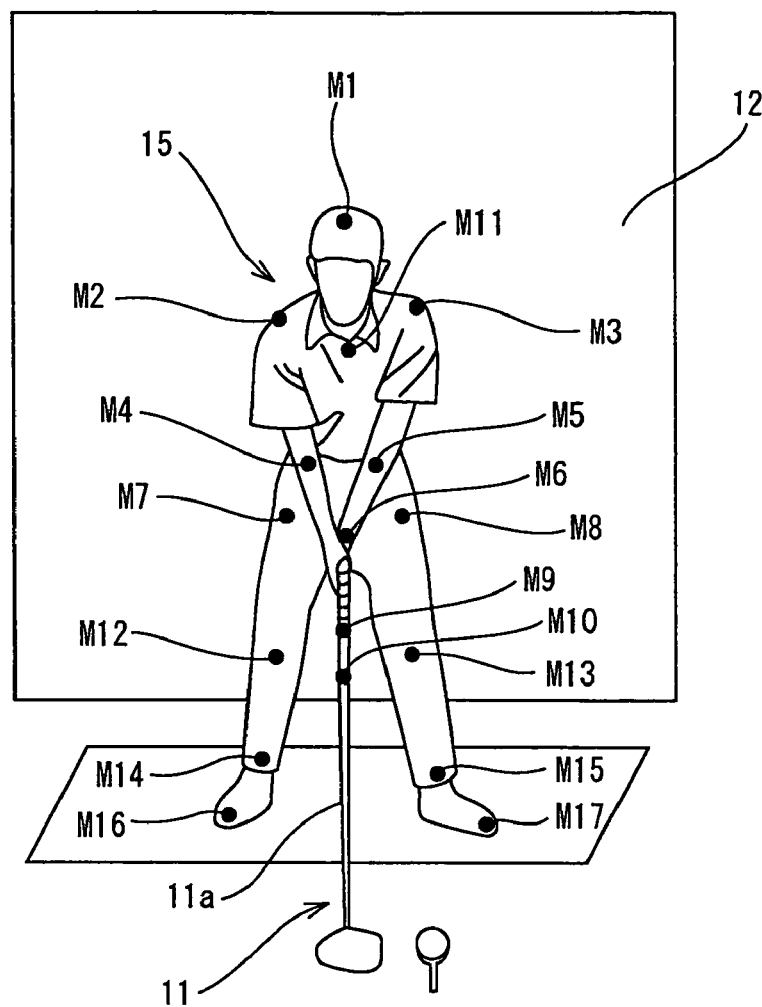
FIG. 1 is a view of a construction of an apparatus of an embodiment of the present invention.
Figure 1:
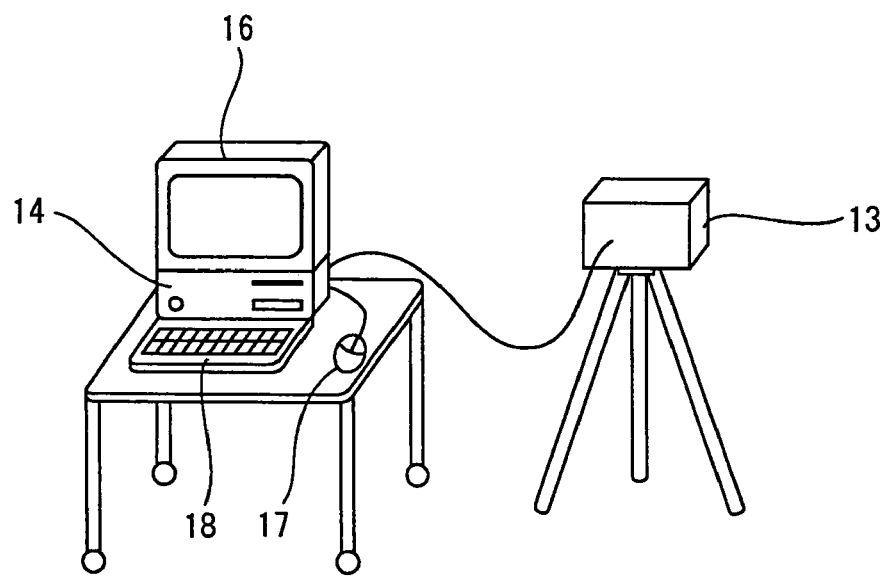

FIG. 1 shows a schematic view of an automatic tracking system for a golf swing as the first embodiment, including a computer 14 serving as information processing equipment; a monitor 16 as a display means connected to the computer 14; a mouse 17 and a keyboard 18 as an input means connected to the computer 14; a color CCD camera 13 installed at a front position of a golfer 15, and connected to the computer 14, wherein marks M1 to M8 and M11 to M17 are attached to a golfer 15, who is a person to be diagnosed, at necessary sites thereof and in addition, two marks M9 and M10 are attached on the shaft 11a of a club 11 spaced apart from each other.

While a reflecting tape, LEDs (an illuminant source constituted of a light emitting diode) or the like may be used as each of the marks M1 to M17, colored semi-spherical foamed styrols are this time adhered to the sites to thereby reduce a change in color due to reflection of light and a color setting scheme for the marks M1 to M17 is such that marks in the vicinity of each other or marks with possibility of superimposing one on the other or one on another are not in the same color but in different colors. For example, different colors are adopted between the marks M1 of the head and M6 of the left wrist; between the marks M9 and M10 of the respective shafts 1 and 2; and between the marks M7 and M8 on both hips; and the like.

The marks M9 and M10 of the shafts 1 and 2 are attached at positions closer to a grip end of the club 11, being spaced apart from each other. This is because positions closer to the grip end are slower in movement and thereby easier to be tracked than positions closer to the head.

To be concrete, colors of the marks M1 to M17 are selected such that the mark M1 at the head is in blue, the mark M2 at the right shoulder is in yellowish green, the mark M3 at the left shoulder is in orange, the mark M4 at the right elbow is in yellow, the mark M5 at the left elbow is in pink, the mark M6 at the left wrist is in a red, the mark M7 at the right hip is in white, the mark M8 at the left hip is in yellowish green, the mark M9 on the shaft 1 on the grip end side is in pink, the mark M10 on the shaft 2 on the head side is in white, the mark M11 at the neck is in purple, the mark M12 at the right knee is in orange, the mark M13 at the left knee is in red, the mark M14 at the right ankle is in red, the mark M15 at the left ankle is in white, the mark M16 at the fore-end of the right foot is in blue and the mark M17 at the fore-end of the left foot is in orange.

Photographing with the color CCD camera 13 of an analog type is at a rate of 30 or more frames per 1 sec and preferably at a rate of 60 frames or more per 1 sec, photographing with the color CCD camera of a high speed digital type is at a rate of 60 or more frames per 1 sec and preferably at a rate of 120 or more frames per 1 sec and photographing with a general purpose digital CCD video camera is at a rate of 30 or more frames per 1 sec with a shutter speed of $\frac{1}{500}$ sec or less and preferably $\frac{1}{1000}$ sec or less.

A brightness in a space (with a size of 3 m long×3 m wide×2 m high) in which a swing is photographed requires 1000 1x or higher in a case of an analog CCD camera, while requiring 1500 1x or higher in a case of a high speed digital CCD camera. Since a possibility of halation occurs if there is present a site at which a luminance is extremely high even at 1000 or 2000 1x or higher, a swing environment is preferably set in the range of from 1000 to 1500 1x in a case where an analog CCD camera is used, while being preferably set in the range of from 1500 to 2500 1x in a case where a digital CCD camera is used.

A time in which a swing is photographed by a color CCD camera is preferably on the order of 3 sec including the addressing through the follow-through. If diagnosis covers a motion from a posture at address to the impact, the time may be on the order of 2 sec.

The background 12 of the space where a swing is photographed is preferably in color extremely different from colors of a skin of a golfer 15 and the marks M1 to M17 so as to be easy to extract the colors in background differentiation described later.

The computer 14 is on line connected to the color CCD camera 13 using a LAN cable, IEEE 1394 and I-link or the like and an image photographed by the color CCD camera 13 is stored in a hard disk of the computer 14.

Note that a DV tape is used and photographed images are captured by a computer while being reproduced later and thus, the images may be captured in off line mode without problems.

While a storage format of the image is preferably a BMP format in consideration of a quality of an image, JPEG, TIFF and other formats may be used instead.

Figure 5:
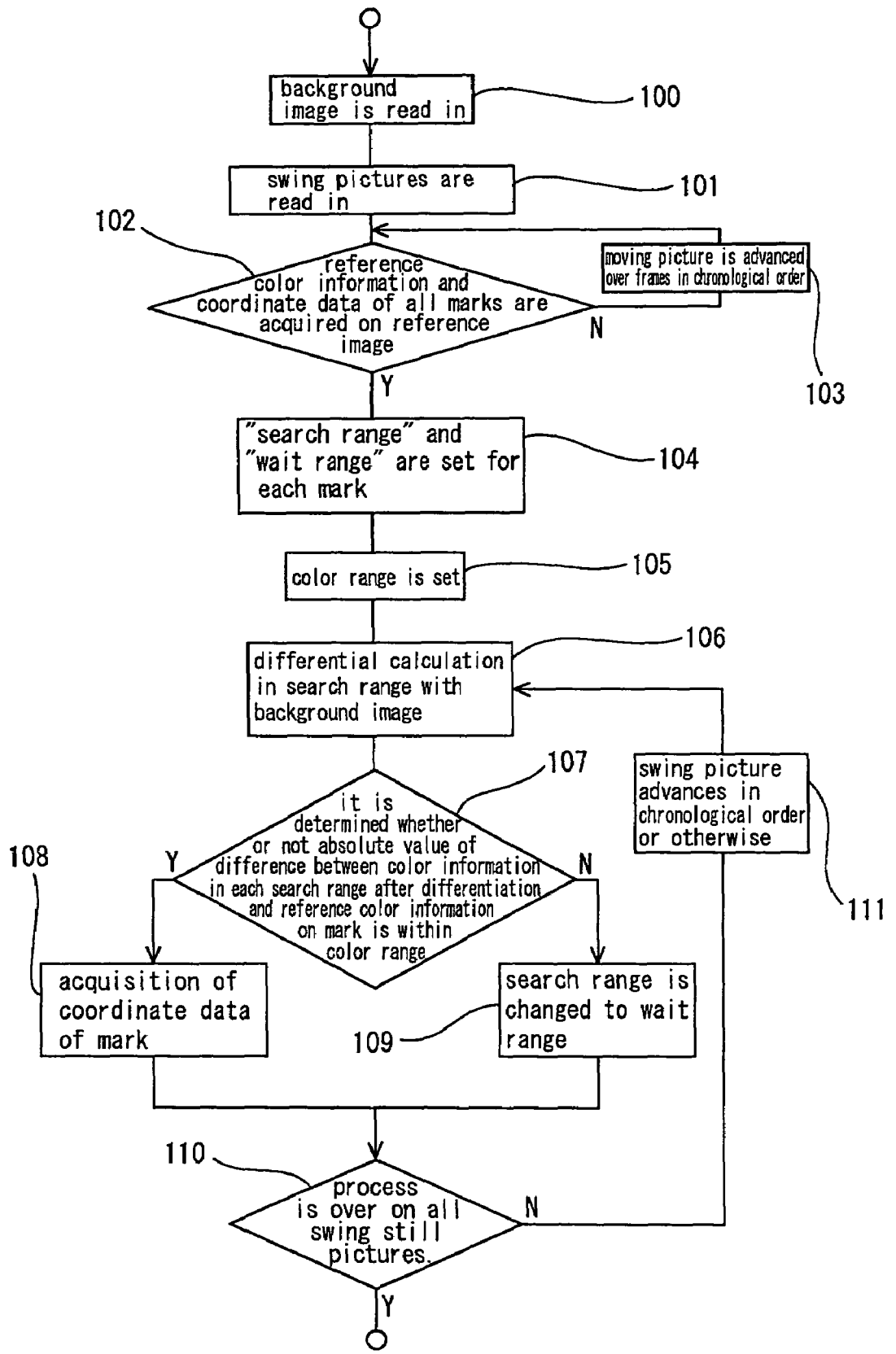
FIG. 5 is a flowchart showing a processing procedure.

Then, description will be given of a procedure in which coordinates of each of the marks M1 to M17 are tracked from swing images captured into the computer 14 with the color CCD camera 13 using a flowchart of FIG. 5.

First of all, only a background image 12 in a state where no golfer 15 exists therein photographed by the color CCD camera 13 is read (step 100), a swing moving image is captured into the computer 14 from the color CCD camera 13 to convert the moving image into still images of respective frames and to then store the still images into a hard disk. Still images in a swing from a golfer at address till the finish (or the impact) are read into a memory (step 101).

Figure 2:
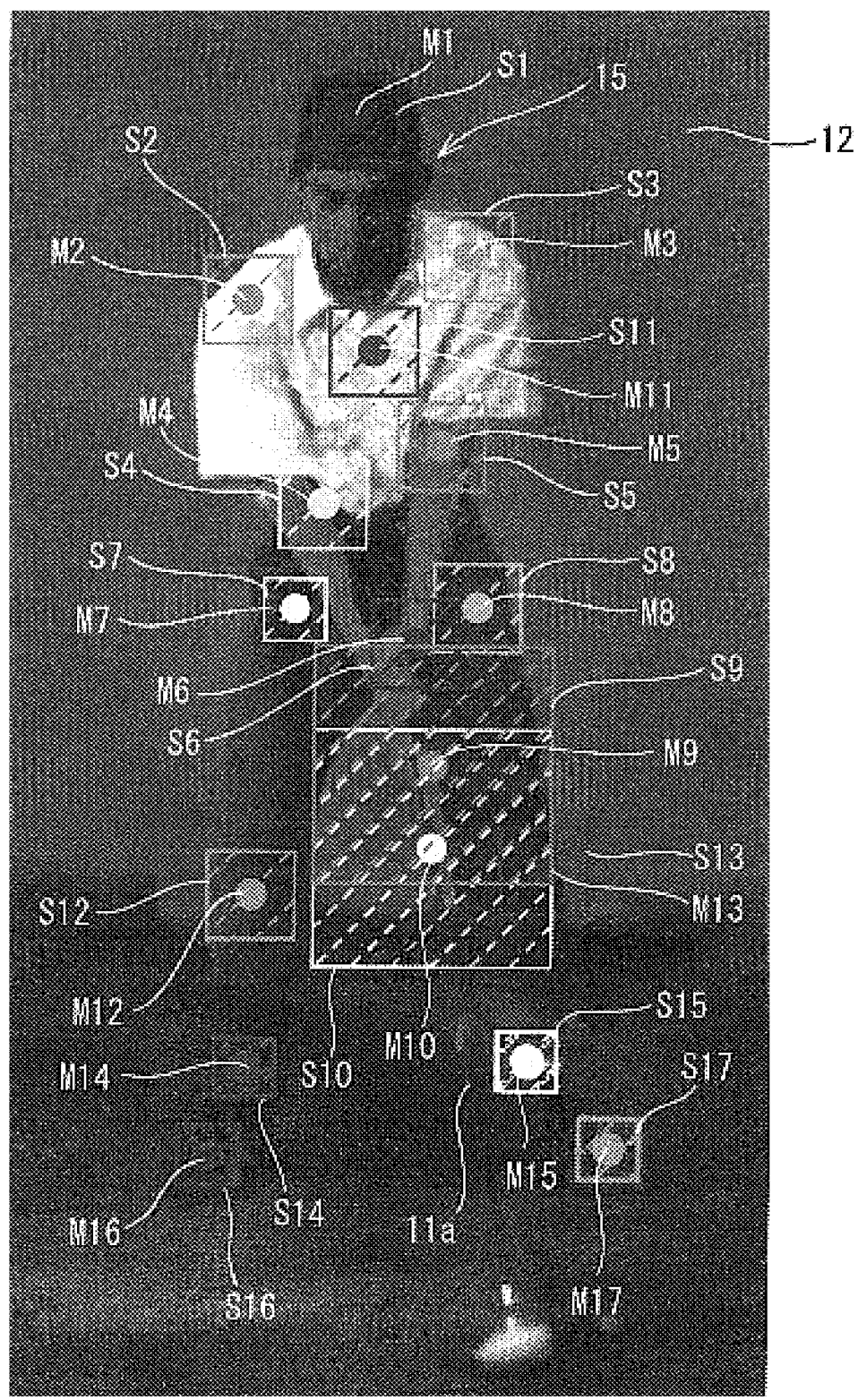
FIG. 2 is a photograph showing a reference image in which marks and search ranges thereof are set.

Then, all the marks M1 to M17 attached on the golfer 15 and the shaft 11a are, as shown in FIG. 2, clicked with the mouse to thereby recognize the marks M1 to M17 with the first image in chronological order as a reference image (step 102). By doing so, reference color information on and coordinate data of all the marks M1 to M17 are acquired (, wherein the term, reference color information means R(red), G(green) and B(blue) which are color information on the marks M1 and M17 on the reference image and has 255 levels starting with 0 and ending at 255 for each color in a case where a color is expressed with 24 bits).

In this context, if a mark of the marks M1 to M17 is hidden by an arm or the like and cannot be recognized, a moving image is advanced over frames in chronological order till all the marks M1 to M17 can be recognized (step 103) to acquire reference color information on and coordinates of all the marks M1 to M17 on a specific image.

Note that it is also allowed that color information on all the marks M1 to M17 is inputted in advance to thereby recognize the coordinates automatically instead of all the marks M1 to M17 being recognized manually using the mouse 17.

Figure 3:
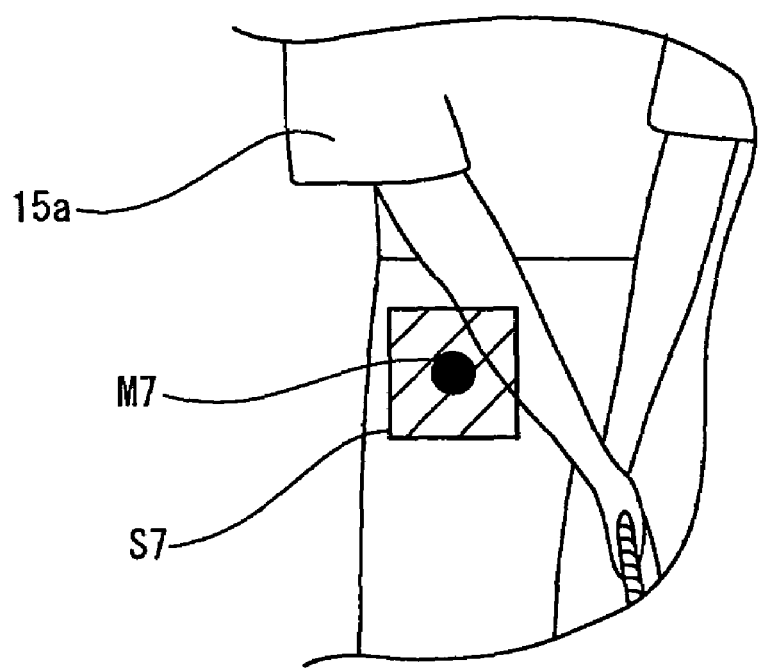
FIG. 3 is an enlarged view of a main part showing a mark and a search range thereof.

Not only are a quadrangular search ranges S1 to S17 set at the marks M1 to M17 with the marks M1 to M17 as centers, but also wait ranges that are larger than the respective search ranges S1 to S17, which substitute for the respective search ranges S1 to S17 if the marks M1 to M17 are hidden (step 104). (Note that while only the search ranges S1 to S17 are viewed in FIG. 2 since none of the hidden marks M1 to M17 is present, the wait ranges are assigned to the individual marks M1 to M17 in a similar manner to that in the search ranges S1 to S17 and the 17 wait ranges W1 to W17 are ready for use in correspondence to the marks S1 to S17 or M1 to M17.) Herein, the search ranges S1 to S17 mean ranges on an image, each of which is a calculation objective on which detection processings for the marks M1 to M17 are conducted. If a concept of the search ranges S1 to S17 are introduced, a detection processing for the mark M7 is conducted only within the search range S7; therefore, even if a color of the mark M7 attached at the right hip of the golfer 15 and a color of a white shirt 15a which the golfer 15 wears is close in hue as shown in FIG. 3, it can be prevented to erroneously recognize the white shirt as the mark M7.

In this embodiment, the search ranges each are formed with a range of 10×10 pixels in length and width (X and Y) with each of the marks M1 to M17 as a center in a default mode. (Note that on a display screen, a lateral direction is adopted as the X axis and a longitudinal direction is adopted as the Y axis.) In a case where the number of photographed frames by the CCD camera 13 is 120 frames/sec with the default value as a reference, customization is applied such that a search range for a mark moving widely as on the upper half of the body is set, as the maximum, to a range three times as large in area while since a mark as on the lower half of the body is almost unmoved during the swing, a search range is set, as the minimum, as small as 0.5 times as large. In this context, if a mark that moves by a greater distance in a lateral direction as in the mark M10 at the shaft 2 has a search range not in the shape of a square but in the shape of a rectangle, a tracing probability can be enhanced without increasing an area of the search range S10.

On the other hand, one of the wait ranges replace the corresponding one of the search ranges S1 to S17 in a case where the corresponding one of the marks M1 to M17 is hidden by an arm or the like, and the wait ranges are set to the respective marks M1 to M17 and larger than the search ranges S1 to S17 of the marks M1 to M17. In this embodiment, a size of a wait range is set to a range of 15×15 pixels in length and width (X and Y) with each of the marks M1 to M17 as a center in a default mode with a magnification relative to the search ranges S1 to S17 in the range of from ×1.5 to ×10, wherein customization is applied such that a magnification for one moving more widely of the marks M1 to M17 is set larger than the others, while a magnification for one moving more narrowly is set smaller.

Then, color ranges are set (step 105).

The term, color ranges, means error tolerance ranges in which color information at a site of an objective on a still image within the range is regarded as the same as the reference color information of the corresponding mark and in this embodiment, the error tolerance range is set within ±40 for each of R (red), G (green) and B (blue) in a default mode. Color information values r, g and b of R (red), G (green) and B (blue) at a site of an objective are compared with reference color information values r', g' and b', respectively, of a mark and if differences thereof as error are all within ±40, the site is regarded the same as the corresponding mark, that is the site of an objective is regarded as one of the marks M1 to M17. Note that customization can be applied on color ranges such that the default ranges are increased or decreased.

Another method for detecting the marks M1 to M17 can be provided in such way that if the sum of the absolute values of differences between color information values r, g and b of a site of an objective and reference color information values r', g' and b', respectively, of a mark |r−r'|+|g−g'|+|b−b'| is equal to or less than a preset threshold value, the mark may be determined as one of the marks M1 to M17, while if more than the threshold value, the site must not be determined as any of the marks M1 to M17. Note that about 30 is preferable as the threshold value.

Still another method for detecting the marks M1 to M17 can be provided in such a way that whether or not the site of an objective is one of the marks M1 to M17 is determined by a norm (the square root of the sum of squares of differences between color information values r, g and b of a site of an objective and reference color information values r', g' and b', respectively, of a mark):

$$\sqrt{(r-r')^2+(g-g')^2+(b-b')^2}$$

A differential processing with a background image in each of the search ranges under one of the above set conditions (step 106). With the differential processing applied, a merit is enjoyed that a background image is removed in each of the search ranges S1 to S17 and in a case where, when recognition of each of the marks M1 to M17 is conducted in a later step, no erroneous recognition is occurred even if there exists a color close to one of the marks M1 to M17 in a background image.

Herein, the term, background differential processing, means a processing in which a differentiation is applied to each pixel site with RGB values of an image of the golfer 15 photographed by the camera while scanning is conducted over a background image of the background 12 and if the sum of the absolute difference values squared in regard to RGB values is more than a threshold value (for example, 30), a golfer image of the golfer 15 is correctly recognized.

Note that the search ranges S1 to S17 in each of which a differential processing is conducted can be selected: all of the search ranges are processed or no processing is allowed to be conducted in a search range in which a possibility is low that the marks M1 to M17 are erroneously recognized as a background image of the background 12.

Then, it is determined whether or not the absolute value of a difference between pixel color information in each of the search ranges S1 to S17 after the differentiation and reference color information on a mark is within the set color range (step 107).

If only one pixel is present in the color range, a corresponding site in the search ranges S1 to S17 is recognized as one of the marks M1 to M17 while plural pixels are present in the color range, a site at which the absolute value of a difference is the minimum in like absolute values is recognized as one of the marks M1 to M17, followed by acquisition of coordinates of the one mark (step 108).

If it is determined that a site being considered falls outside the color range, the marks M1 to M17 in the search ranges S1 to S17 are considered to be hidden by an arm or the like into the absence; therefore, the swing image is advanced in chronological order and at the same time, the search ranges S1 to S17 are changed to wait ranges, which are regions larger than the search ranges, in case where the marks M1 to M17 emerge on a still image (step 109).

Figure 4A:
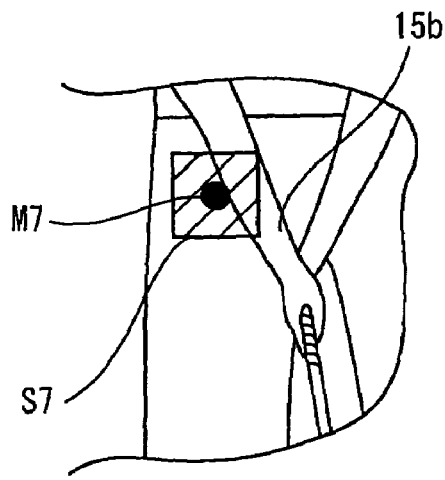
FIGS. 4(A) to 4(C) are enlarged views of a main part describing a change from a search range to a wait range.
Figure 4B:
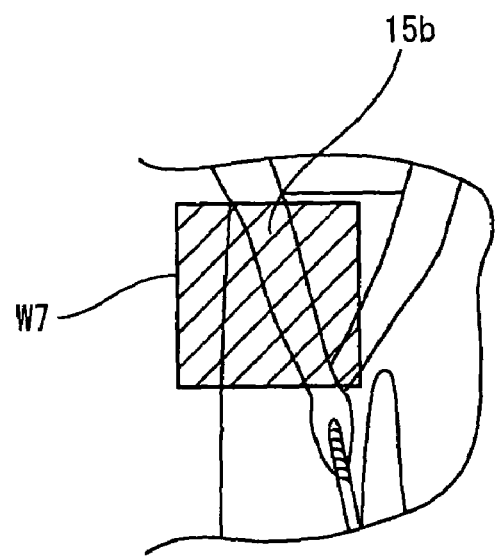
Figure 4C:
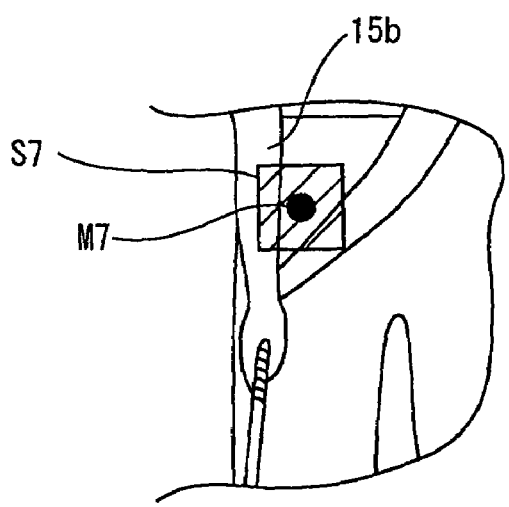

To be detailed, in a case where the mark M7 is in sight as shown in FIG. 4(A) and not hidden by an arm of the golfer 15, the search range S7 is set and, in a still image advanced in chronological order, the mark M7 is hidden by the arm 15b as shown in FIG. 4(B) and cannot be recognized. The search range S7 is changed to a wait range W7 larger than the search range S7 at this time point so that the mark M7 can be caught when the mark M7 emerges on a still image further advanced in chronological order. If the mark M7 having been hidden by the arm 15b emerges as shown in FIG. 4(C), when the swing image advances in chronological order, and can be recognized, the wait range W7 is changed back to the search range S7.

If the above procedure has not been applied to all of the swing images (step 110), the swing moving image is further advanced in chronological order (step 111) to repeat the similar procedure.

Note that in a case where a still image on which reference color information on and coordinates of the all of the marks M1 to M17 are acquired is not the first still image in chronological order, the procedure is applied on still images retroactively in reverse chronological order. By ending application of the procedure on all of the swing still images, coordinates of all of the marks M1 to M17 can be eventually obtained through the swing motion from the addressing till the finish.

EXAMPLE 1

Then, description will be given of the first embodiment showing examples.

TABLE 1

| | | initial settings | | | | | | | Comparative Example (1) | | Comparative Example (2) | | Example (1) | |
|---|---|---|---|---|---|---|---|---|---|---|---|---|---|---|
| | | | | | | | | | | Automatic | | Automatic | | Automatic |
| | marks | search ranges | | wait ranges | | Color ranges | | | background differential processing | tracking recognizability % | background differential processing | tracking recognizability % | background differential processing | tracking recognizability % |
| | attaching positions | colors | X | Y | X | Y | R | G | B | | | | | | |
| 1 | head | blue | 10 | 10 | 15 | 15 | 40 | 40 | 40 | no | 100 | yes | 100 | no | 100 |
| 2 | right shoulder | yellowish green | 10 | 10 | 15 | 15 | 40 | 40 | 40 | no | 92.1 | yes | 92.1 | no | 92.1 |
| 3 | left shoulder | orange | 10 | 10 | 15 | 15 | 40 | 40 | 40 | no | 94.2 | yes | 94.2 | no | 94.2 |
| 4 | right elbow | yellow | 15 | 15 | 40 | 40 | 40 | 40 | 40 | no | 97.2 | yes | 97.2 | no | 97.2 |

TABLE 1-continued

| | | initial settings | | | | | | | Comparative Example (1) | | Comparative Example (2) | | Example (1) | |
|---|---|---|---|---|---|---|---|---|---|---|---|---|---|---|
| marks attaching positions | colors | search ranges X | Y | wait ranges X | Y | Color ranges R | G | B | background differential processing | Automatic tracking recognizability % | background differential processing | Automatic tracking recognizability % | background differential processing | Automatic tracking recognizability % |
| 5 left elbow | pink | 10 | 10 | 15 | 15 | 40 | 40 | 40 | no | 96.6 | yes | 96.6 | no | 96.6 |
| 6 right wrist | red | 15 | 15 | 40 | 40 | 40 | 40 | 40 | no | 98.2 | yes | 98.2 | no | 98.2 |
| 7 right hip | white | 10 | 10 | 15 | 15 | 40 | 40 | 40 | no | 100 | yes | 100 | no | 100 |
| 8 left hip | yellowish green | 10 | 10 | 15 | 15 | 40 | 40 | 40 | no | 97.3 | yes | 97.3 | no | 97.3 |
| 9 shaft 1 | pink | 30 | 30 | 40 | 25 | 40 | 40 | 40 | no | 30.2 | yes | 72.1 | yes | 72.1 |
| 10 shaft 2 | white | 30 | 30 | 40 | 25 | 40 | 40 | 40 | no | 40.3 | yes | 74.3 | yes | 74.3 |
| 11 neck | purple | 15 | 10 | 20 | 15 | 40 | 40 | 40 | no | 92.1 | yes | 92.1 | no | 92.1 |
| 12 right knee | orange | 7 | 7 | 10 | 10 | 40 | 40 | 40 | no | 100 | yes | 100 | no | 100 |
| 13 left knee | red | 7 | 7 | 10 | 10 | 40 | 40 | 40 | no | 100 | yes | 100 | no | 100 |
| 14 right ankle | red | 7 | 7 | 10 | 10 | 40 | 40 | 40 | no | 100 | yes | 100 | no | 100 |
| 15 left ankle | white | 7 | 7 | 10 | 10 | 40 | 40 | 40 | no | 100 | yes | 100 | no | 100 |
| 16 fore-end of right foot | blue | 7 | 7 | 10 | 10 | 40 | 40 | 40 | no | 100 | yes | 100 | no | 100 |
| 17 fore-end of left foot | orange | 7 | 7 | 10 | 10 | 40 | 40 | 40 | no | 100 | yes | 100 | no | 100 |
| Automatic tracking processing time | | | | | | | | | | 15 sec | | 80 sec | | 17 sec |

Positions and colors of the marks M1 to M17 are set as shown in Table 1, wherein colors of marks having a risk of being superimposed one on the other or one on another, of being close to each other or one another are set so as not to be the same. The mark M19 on the shaft 1 is attached at a position of 200 mm from the grip end, the mark M10 on the shaft 2 is attached at a position of 400 mm from the grip end.

The search ranges each are formed, as a default value, with a range of 10×10 pixels in length and width (X and Y), while the search ranges of a right elbow and a left wrist each are formed with a range of 15×15 pixels since movement thereof is fast, the search range of a neck is formed not in a square but in a rectangle with a range of 15×10 pixels giving consideration to a direction of movement of the mark M11 and the search ranges of the shafts 1 and 2 each are formed with a range of 30×30 pixels since distances of movement of the marks M9 and M10 are large.

The wait ranges each are formed, as a default value, with a range of 15×15 pixels in length and width (X and Y), while the wait ranges of a right elbow and a left wrist each are formed with a range of 40×40 pixels since distances of movement thereof are large, the wait range W11 of a neck is formed not in a square but in a rectangle with a range of 20×15 pixels giving consideration to a direction of movement of the mark M11 and the search ranges of the shafts 1 and 2 each are formed with a range of 40×25 pixels since distances of movement of the marks M9 and M10 are large.

Since the marks M12 to M17 lower than the knees are almost stationary during a swing, the search and wait ranges are set smaller than the default value to adopt respective ranges of 7×7 pixels and 10×10 pixels for reduction in calculation time.

A color range for each of colors (R), (G) and (B) is set within ±40.

A color of the background 12 is preferably whitish blue or whitish green so that a skin color of a golfer 15, colors of the marks M1 to M17 are extracted with ease in differentiation processing. However, another color may be selected as a color of the background 12 according to clothes that a golfer wears.

Photographing conditions for the color CCD camera 13 are a shutter speed of 1/500 sec, the number of photographed frames per a unit time of 125 frames/sec, a brightness in a back- and downswing regions of a photographing space of 2000 1x or more and a follow-through region thereof of 1000 1x or more.

A swing photographing time is about 3 sec, under which photographing was conducted during a period from the addressing till the finish. The computer 14 is a personal computer with a CPU: Pentium III1 type processor at 2GKz, and a memory of 256 MB and a storage format of a still image is BMP format.

A differential processing with a background image is conducted only on the shafts 1 and 2 which are predicted to be confused by a background color in the search ranges and the wait ranges, while on the other hand, no differential processing with a background image is conducted in the search ranges and the wait ranges of the other points.

COMPARATIVE EXAMPLE 1

In Comparative Example 1, no differential processing with a background image is conducted and instead, an automatic tracking was applied in all of the search ranges and the wait ranges thereof. Note that the other conditions are the same as in Example 1.

COMPARATIVE EXAMPLE 2

In Comparative Example 2, a differential processing with a background image is conducted in all of the search ranges and the wait ranges thereof. Note that the other conditions are the same as in Example 1.

Evaluation

While an automatic recognizability percentage is low in Comparative Example, for a color of the background 12 is erroneously tracked at two sites of the shafts 1 and 2, a background differential processing, in Example 1, is conducted at the two sites of the shafts 1 and 2; therefore, no chance exists to track the color of the background, thereby improving an automatic tracking recognizability.

Note that the term, automatic tracking recognizability means a value, expressed in percentage, obtained by dividing the sum of the number of frames in which mark positions in calculation tracked in the search ranges that coincide with the actual marks M1 to M17, and the number of frames using the wait ranges, with the number of all the frames, wherein the percentage values obtained by the respective 50 testers are averaged for each mark, and the average values are presented as automatic tracking recognizabilities in the respective examples.

In Comparative Example 2, it takes 80 sec as an automatic tracking processing time, while in Example 1, it takes only 15 sec and, despite an automatic tracking recognizability being kept high, a calculation time is greatly reduced as compared with Comparative Example 2 in which a background processing is conducted on each of all the marks M1 to M17.

Then, description will be given of the second embodiment.

In this embodiment, tracking is conducted on a reference mark M9 in a similar manner to that in Example 1 with the mark M9 at the shaft 1 closer to the left wrist of a golfer as the reference marks M9 to acquire coordinate data of the reference mark 9 and to calculate a distance of movement of the reference mark M9 between still images adjacent to each other chronologically.

Then, in a case where the mark M10 at the shaft 2 is tracked, the search range S10 corresponding to the mark M10 is moved on a still image being considered as an objective by a distance of movement of the reference mark M9 from the still image of the next previous frame and color search is conducted in the same way as in the first embodiment in the search range A10 after the movement.

According to the above method, since the gripping hands of a golfer move in almost the same manner as a golf shaft, color search is conducted in the search range S10 on a still image, which is an objective, shifted by the distance of movement of the mark M9 at the shaft 1 closer to the wrist, whereby a possibility is raised of the mark M10 being in the search range S10, leading to improvement on automatic tracking recognizability of the mark M10. In addition, with an improved automatic recognizability, it is possible to narrow the search range S10, resulting in reduction in calculation time.

Furthermore, the reason why the wait ranges W9 and W10 which are regions larger than the search ranges S9 and S10 are used because of inability of recognition in the search ranges S9 and S10 is that since improvement is acquired on automatic tracking recognizability on the marks M9 and M10 in the search ranges S9 and S10, a tendency arises to use still images of a few frames immediately before the impact at the fastest speed in movement of the marks M9 and M10 attached at the shafts 1 and 2, which decreases a frequency of use of the wait ranges W9 and W10, leading to further reduction in useless search time.

Note that a construction in the other parts combined is similar to that of Example 1; therefore, the description thereof is omitted.

EXAMPLE 2

Then, description will be given of the second embodiment showing concrete examples.

TABLE 2

| Marks | | initial settings | | | initial settings (Comparative Example (3)) | | | | Comparative Example (3) | initial settings (Example (2)) | | | | Example (2) |
|---|---|---|---|---|---|---|---|---|---|---|---|---|---|---|
| Attaching positions | colors | color ranges | | | search ranges | | wait ranges | | automatic tracking recognizability % | search ranges | | wait ranges | | automatic tracking recognizability % |
| | | R | G | B | X | Y | X | Y | | X | Y | X | Y | |
| 1 Head | blue | 40 | 40 | 40 | 10 | 10 | 15 | 15 | 100 | 10 | 10 | 15 | 15 | 100 |
| 2 Right shoulder | yellowish green | 40 | 40 | 40 | 10 | 10 | 15 | 15 | 92.1 | 10 | 10 | 15 | 15 | 92.1 |
| 3 Left shoulder | orange | 40 | 40 | 40 | 10 | 10 | 15 | 15 | 94.2 | 10 | 10 | 15 | 15 | 94.2 |
| 4 right elbow | yellow | 40 | 40 | 40 | 15 | 15 | 40 | 40 | 97.2 | 15 | 15 | 40 | 40 | 97.2 |
| 5 left elbow | pink | 40 | 40 | 40 | 10 | 10 | 15 | 15 | 96.6 | 10 | 10 | 15 | 15 | 96.6 |
| 6 right wrist | red | 40 | 40 | 40 | 15 | 15 | 40 | 40 | 98.2 | 15 | 15 | 40 | 40 | 98.2 |
| 7 right hip | white | 40 | 40 | 40 | 10 | 10 | 15 | 15 | 100 | 10 | 10 | 15 | 15 | 100 |

TABLE 2-continued

| Marks | | initial settings | | | initial settings (Comparative Example (3)) | | | | Comparative Example (3) | initial settings (Example (2)) | | | | Example (2) |
|---|---|---|---|---|---|---|---|---|---|---|---|---|---|---|
| | | color | | | search ranges | | wait ranges | | automatic tracking | search ranges | | wait ranges | | automatic tracking |
| Attaching positions | colors | R | G | B | X | Y | X | Y | recognizability % | X | Y | X | Y | recognizability % |
| 8 left hip | yellowish green | 40 | 40 | 40 | 10 | 10 | 15 | 15 | 97.3 | 10 | 10 | 15 | 15 | 97.3 |
| 9 shaft 1 | pink | 40 | 40 | 40 | 10 | 10 | 40 | 20 | 97.1 | 10 | 10 | 40 | 20 | 100 |
| 10 shaft 2 | white | 40 | 40 | 40 | 10 | 10 | 40 | 20 | 98.2 | 10 | 10 | 40 | 20 | 100 |
| 11 Neck | purple | 40 | 40 | 40 | 15 | 10 | 20 | 15 | 92.1 | 15 | 10 | 20 | 15 | 92.1 |
| 12 right knee | orange | 40 | 40 | 40 | 7 | 7 | 10 | 10 | 100 | 7 | 7 | 10 | 10 | 100 |
| 13 left knee | red | 40 | 40 | 40 | 7 | 7 | 10 | 10 | 100 | 7 | 7 | 10 | 10 | 100 |
| 14 right ankle | red | 40 | 40 | 40 | 7 | 7 | 10 | 10 | 100 | 7 | 7 | 10 | 10 | 100 |
| 15 left ankle | white | 40 | 40 | 40 | 7 | 7 | 10 | 10 | 100 | 7 | 7 | 10 | 10 | 100 |
| 16 fore-end of right foot | blue | 40 | 40 | 40 | 7 | 7 | 10 | 10 | 100 | 7 | 7 | 10 | 10 | 100 |
| 17 fore-end of left foot | orange | 40 | 40 | 40 | 7 | 7 | 10 | 10 | 100 | 7 | 7 | 10 | 10 | 100 |
| automatic tracking processing time | | | | | | | | | 10 sec | | | | | 5 sec |

Example 2 is a concrete version of the second embodiment and a function is adopted in Example 2 that the search ranges S9 and S10 corresponding to the marks M9 and M10 at the shafts 1 and 2 are shifted by the distance of movement of the reference mark M9.

The range in length and width (Y, X) of each of the search ranges of the shafts 1 and 2 is a range of 10×10 pixels smaller than in Example 1 and in addition, the range in length and width (Y, X) of each of the wait ranges of the shafts 1 and 2 is of 40×20 pixels. The other conditions are similar to those in Example 1.

COMPARATIVE EXAMPLE 3

Comparative Example 3 is conducted in a similar way to that in Example 1 except that the search ranges S9 and S10 are not shifted by the distance of movement of the reference mark M9 which is described in the second embodiment.

Evaluation

In comparison of Example 2 with Comparative Example 3 based on Table 2, the automatic tracking recognizabilities of the marks M9 and M10 at the shafts 1 and 2 are 97.1% and 98.1%, respectively, in Comparative Example 3 while being 100% in common in Example 2, leading to understanding that Example 2 is improved in automatic tracking recognizability as compared with Comparative Example 3.

With improvement on automatic tracking recognizability in Example 2, reduction is made in frequency of use of each of the wait ranges having a larger area used in a case where corresponding one of the marks cannot be recognized in the search range thereof and it is understood that an automatic tracking processing time (calculation time) is shortened to 5 sec in Example 2 from 10 sec in Comparative Example 3.

Then, description will be given of the third embodiment.

In this embodiment, in a case where the marks M1 to M17 are not recognized in the respective search ranges S1 to S17 on a still image, color search is conducted in the wait ranges W1 to W17 on the same still image without advancing a swing image over frames in chronological order.

Figure 6:
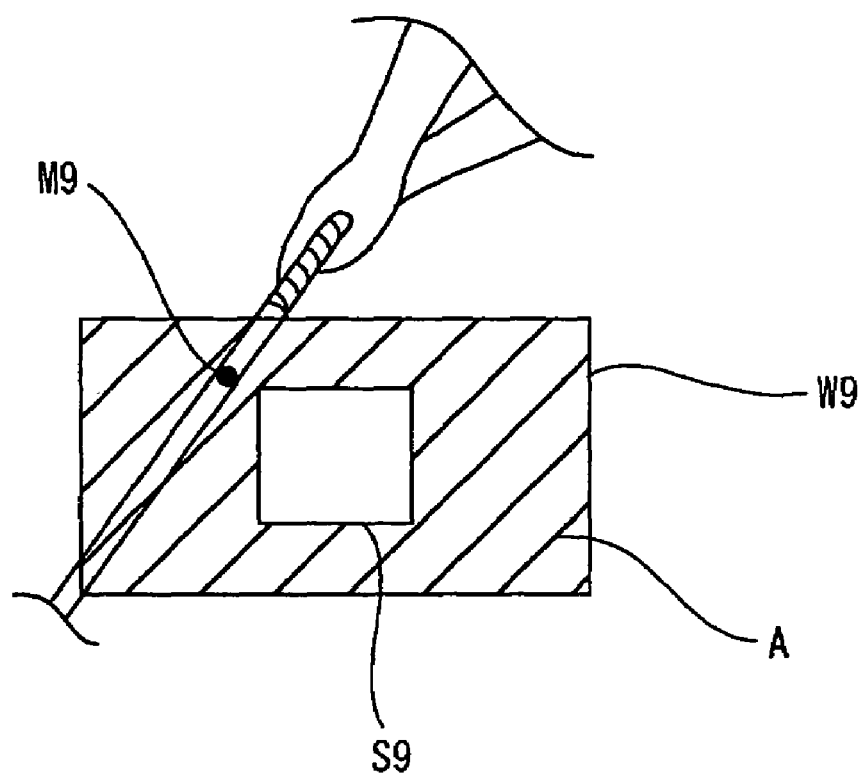
FIG. 6 is a view showing a second search range.
Figure 7:
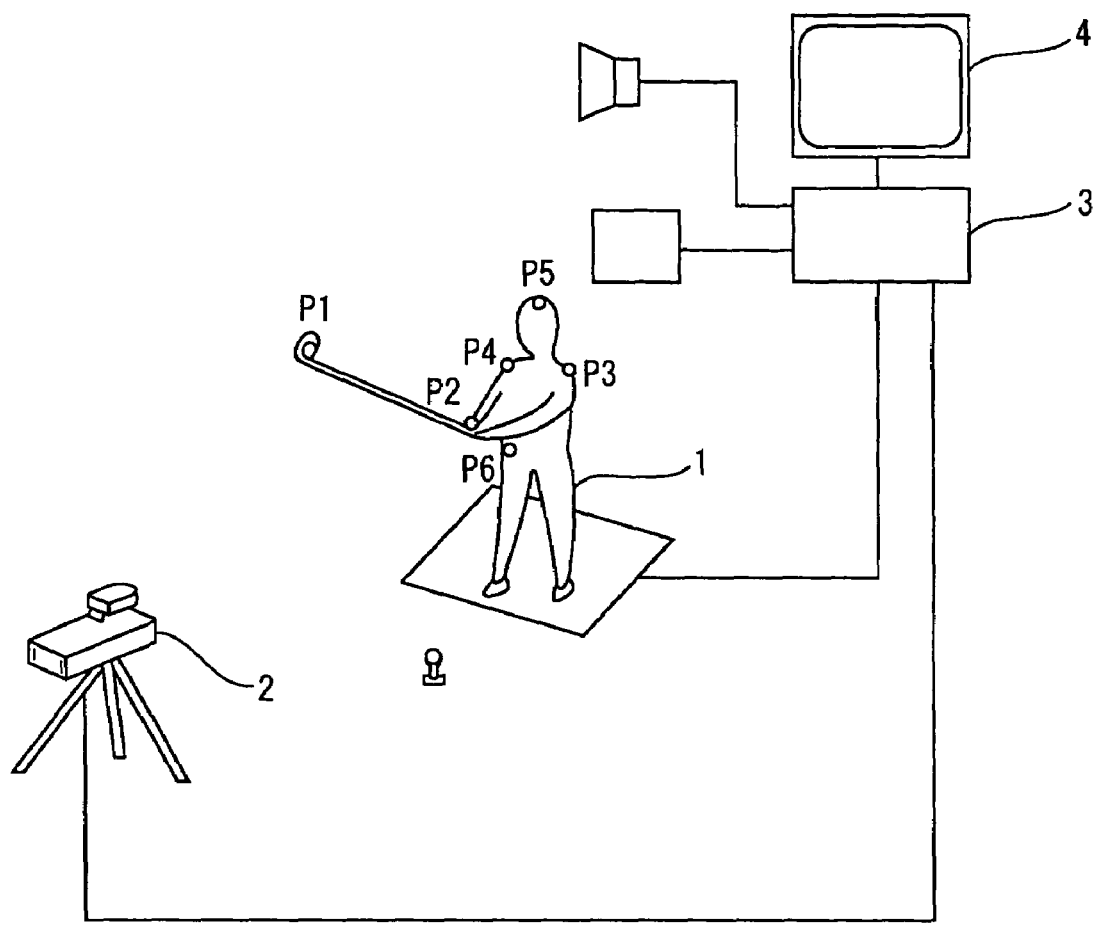
FIG. 7 is a view of a construction of an apparatus in a conventional example.

For example, if the mark M9 is, as shown in FIG. 6, present outside the search range S9 on a still image, no mark M9 can be recognized even in color search within the search range S9. Therefore, the search range S9 is changed to the wait range W9 on the same still image without conducting a color search in the wait range on the next still image and color search is conducted in the differential region A, in the wait range W9, other than the search range S9 in which color search has been conducted to thereby recognize the mark M9. That is, the wait range W9 is used as the second search range on the same still image.

With the construction adopted, recognition of the mark M9 is achieved by color search at two stages conducted, respectively, in the search range S9 which is a smaller region and the wait range which is a larger region W9; therefore, the search range S9 used in common color search can be set smaller in area, thereby enabling reduction in useless calculation time. For example, the mark M9 is recognized in the search range S9 smaller in area in takeback or the like slow in movement to thereby reduce a calculation time, while color search for the mark M9 is conducted in the wait range W9 larger in area only in a case where the mark M9 cannot be recognized in downswing or the like fast in movement. If color search is conducted in the wait range W9, only the differential region A other than the search range S9 is searched, therefore increasing a calculation efficiency.

Note that a construction of the other parts combined is similar to that in the first embodiment; therefore, description thereof is omitted.

EXAMPLE 3

Then, description will be given of the third embodiment showing concrete examples.

TABLE 3

| | | initial settings | | | initial settings (Comparative Example (3)) | | | | Comparative Example (3) | initial settings (Example (2)) | | | | Example (2) |
|---|---|---|---|---|---|---|---|---|---|---|---|---|---|---|
| Marks | | color | | | search | | wait | | automatic | search | | wait | | automatic |
| Attaching | | ranges | | | ranges | | ranges | | tracking | ranges | | ranges | | tracking |
| positions | colors | R | G | B | X | Y | X | Y | recognizability % | X | Y | X | Y | recognizability % |
| 1 Head | blue | 40 | 40 | 40 | 10 | 10 | 15 | 15 | 100 | 10 | 10 | 15 | 15 | 100 |
| 2 right shoulder | yellowish green | 40 | 40 | 40 | 10 | 10 | 15 | 15 | 92.1 | 10 | 10 | 15 | 15 | 92.1 |
| 3 left shoulder | orange | 40 | 40 | 40 | 10 | 10 | 15 | 15 | 94.2 | 10 | 10 | 15 | 15 | 94.2 |
| 4 right elbow | yellow | 40 | 40 | 40 | 15 | 15 | 40 | 40 | 97.2 | 15 | 15 | 40 | 40 | 97.2 |
| 5 left elbow | pink | 40 | 40 | 40 | 10 | 10 | 15 | 15 | 96.6 | 10 | 10 | 15 | 15 | 96.6 |
| 6 right wrist | red | 40 | 40 | 40 | 15 | 15 | 40 | 40 | 98.2 | 15 | 15 | 40 | 40 | 98.2 |
| 7 right hip | white | 40 | 40 | 40 | 10 | 10 | 15 | 15 | 100 | 10 | 10 | 15 | 15 | 100 |
| 8 left hip | yellowish green | 40 | 40 | 40 | 10 | 10 | 15 | 15 | 97.3 | 10 | 10 | 15 | 15 | 97.3 |
| 9 shaft 1 | pink | 40 | 40 | 40 | 30 | 30 | 40 | 25 | 72.1 | 10 | 10 | 40 | 20 | 97.1 |
| 10 shaft 2 | white | 40 | 40 | 40 | 30 | 30 | 40 | 25 | 74.3 | 10 | 10 | 40 | 20 | 98.2 |
| 11 Neck | purple | 40 | 40 | 40 | 15 | 10 | 20 | 15 | 92.1 | 15 | 10 | 20 | 15 | 92.1 |
| 12 right knee | orange | 40 | 40 | 40 | 7 | 7 | 10 | 10 | 100 | 7 | 7 | 10 | 10 | 100 |
| 13 left knee | red | 40 | 40 | 40 | 7 | 7 | 10 | 10 | 100 | 7 | 7 | 10 | 10 | 100 |
| 14 right ankle | red | 40 | 40 | 40 | 7 | 7 | 10 | 10 | 100 | 7 | 7 | 10 | 10 | 100 |
| 15 left ankle | white | 40 | 40 | 40 | 7 | 7 | 10 | 10 | 100 | 7 | 7 | 10 | 10 | 100 |
| 16 fore-end of right foot | blue | 40 | 40 | 40 | 7 | 7 | 10 | 10 | 100 | 7 | 7 | 10 | 10 | 100 |
| 17 fore-end of left foot | orange | 40 | 40 | 40 | 7 | 7 | 10 | 10 | 100 | 7 | 7 | 10 | 10 | 100 |
| automatic tracking processing time | | | | | | | | | 17 sec | | | | | 10 sec |

Example 3 is a concrete version of the third embodiment and the range in length and width (Y, X) of each of the search ranges of the shafts 1 and 2 is a range of 10×10 pixels smaller than in Example 1 and in addition, the range in length and width (Y, X) of each of the wait ranges of the shafts 1 and 2 is of 40×20 pixels. The other conditions are similar to those in Example 1.

COMPARATIVE EXAMPLE 4

Comparative Example 4 is similar to Example 1 described above.

Evaluation

In comparison of Example 3 with Comparative Example 4 based on Table 3, automatic tracking recognizabilities of the marks M9 and M10 at the shafts 1 and 2 are, respectively, 72.1% and 74.3% in Comparative Example 4, while being, respectively, 97.1% and 98.1% in Example 3. That is, it is understood that Example 3 is improved in automatic tracking recognizability as compared with Comparative Example 4.

It is also understood that since an area of a search range (and a wait range) can be set smaller in Example 3, an automatic tracking processing time is reduced to 10 sec in Example 3 from 17 sec in Comparative Example 4.

What is claimed is:

1. An automatic tracking method for a golf swing, comprising the following steps of:

attaching colored marks to plural positions including any one place of a golfer, which is a measurement objective, and at least one necessary position on a golf club that the golfer uses, before the golfer initiates a swing;

photographing a background image of a swing place in which a golfer is not photographed and a swing moving image from a scene at address of the golfer to the finish thereof with a camera as color images;

not only storing the photographed background image into a computer, but also storing plural still images converted from the swing moving image into the computer;

adopting, of the still images, a specific still image in which all the marks can be recognized as a reference image and storing reference color information and coordinate data for positional information of each mark manually or automatically in advance;

setting, on a still image being considered, for each of the mark positions thereon, a search range, which is a region including the position of the predicted mark on a still image adjacent in chronological order to the still image being considered and a wait range which is a region larger than the search range, in consideration of a case where the marks would not be recognized in the search range and setting a color range of each mark that is an allowable range, in which colors can be regarded as the same as reference color information thereof;

changing the search range of the still image being considered to the wait range thereof in a case where a mark is hidden and not recognized in the search range thereof;

regarding a pixel, as a position of a mark, in a case where the absolute value of a difference between a color of the pixel in the still image being considered on which a differential processing has been conducted with the background image in the search range or the wait range and the reference color information falls within the color range and is the minimum of absolute values obtained from other pixels to conduct a color search and obtain coordinate data; and automatically tracking the marks moving during the swing.

2. The automatic tracking method for a golf swing according to claim 1, wherein the colored marks are provided at least two sites spaced from each other on the shaft of a golf club in the length direction thereof; and at least one site on a golfer selected from the head, the right and left shoulders, the right and left elbows, the right and left wrists, the right and left hips, the right and left knees, the right and left ankles and the right and left toes.

3. The automatic tracking method for a golf swing according to claim 2, wherein in a case where a mark being considered cannot be recognized in a search range on a still image, the search range is changed to the wait range thereof on the same still image and a color search is conducted in the wait range other than the search range where the color search has been already conducted.

4. The automatic tracking method for a golf swing according to claim 2, wherein in a case where a pixel which has the absolute value of a difference from the reference color information being in the color range and being the minimum of absolute values in the search range or the wait range is regarded as a position of a mark and coordinate data thereof is obtained, it is selectable whether or not a differential processing with the background image is conducted on each of the mark positions.

5. The automatic tracking method for a golf swing according to claim 2, wherein one of the marks is adopted as a reference mark and tracked to measure a moving distance of the reference mark between still images at respective different time points, and in a case where another mark is tracked, a color search is conducted in a search range on a new still image corresponding to the another mark and the search range is moved by the moving distance of the reference mark.

6. The automatic tracking method for a golf swing according to claim 2, wherein, of the plural marks, colors of marks having chances to be close to each other, or superimposed one on the other or one on another during a swing are differently set.

7. The automatic tracking method for a golf swing according to claim 1, wherein in a case where a pixel which has the absolute value of a difference from the reference color information being in the color range and being the minimum of absolute values in the search range or the wait range is regarded as a position of a mark and coordinate data thereof is obtained, it is selectable whether or not a differential processing with the background image is conducted on each of the mark positions.

8. The automatic tracking method for a golf swing according to claim 7, wherein, of the plural marks, colors of marks having chances to be close to each other, or superimposed one on the other or one on another during a swing are differently set.

9. The automatic tracking method for a golf swing according to claim 7, wherein in a case where a mark being considered cannot be recognized in a search range on a still image, the search range is changed to the wait range thereof on the same still image and a color search is conducted in the wait range other than the search range where the color search has been already conducted.

10. The automatic tracking method for a golf swing according to claim 7, wherein one of the marks is adopted as a reference mark and tracked to measure a moving distance of the reference mark between still images at respective different time points, and in a case where another mark is tracked, a color search is conducted in a search range on a new still image corresponding to the another mark and the search range is moved by the moving distance of the reference mark.

11. The automatic tracking method for a golf swing according to claim 1, wherein, of the plural marks, colors of marks having chances to be close to each other, or superimposed one on the other or one on another during a swing are differently set.

12. The automatic tracking method for a golf swing according to claim 11, wherein one of the marks is adopted as a reference mark and tracked to measure a moving distance of the reference mark between still images at respective different time points, and in a case where another mark is tracked, a color search is conducted in a search range on a new still image corresponding to the another mark and the search range is moved by the moving distance of the reference mark.

13. The automatic tracking method for a golf swing according to claim 11, wherein in a case where a mark being considered cannot be recognized in a search range on a still image, the search range is changed to the wait range thereof on the same still image and a color search is conducted in the wait range other than the search range where the color search has been already conducted.

14. The automatic tracking method for a golf swing according to claim 1, wherein one of the marks is adopted as a reference mark and tracked to measure a moving distance of the reference mark between still images at respective different time points, and in a case where another mark is tracked, a color search is conducted in a search range on a new still image corresponding to the another mark and the search range is moved by the moving distance of the reference mark.

15. The automatic tracking method for a golf swing according to claim 14, wherein a mark provided to the right wrist or the left wrist of a golfer, or a mark closer to a wrist of at least two marks provided on a shaft is adopted as a reference mark, and the another mark is provided on a shaft.

16. The automatic tracking method for a golf swing according to claim 14, wherein in a case where a mark being considered cannot be recognized in a search range on a still image, the search range is changed to the wait range thereof on the same still image and a color search is conducted in the wait range other than the search range where the color search has been already conducted.

17. The automatic tracking method for a golf swing according to claim 1, wherein in a case where a mark being considered cannot be recognized in a search range on a still image, the search range is changed to the wait range thereof on the same still image and a color search is conducted in the wait range other than the search range where the color search has been already conducted.

* * * * *